ELONGATED ELECTRODE AND TARGET ARRANGEMENT FOR AN RF SPUTTERING APPARATUS AND METHOD OF SPUTTERING

Filed Jan. 22, 1970 7 Sheets-Sheet 1

INVENTORS
WILLIAM C LESTER
CARLO NUCCIO
ERNEST S. WARD
BY Frank C. Leach Jr
ATTORNEY Dec. 26, 1972 W. C. LESTER ET AL 3,707,452

ELONGATED ELECTRODE AND TARGET ARRANGEMENT FOR AN RF SPUTTERING APPARATUS AND METHOD OF SPUTTERING

Filed Jan. 22, 1970 7 Sheets-Sheet 3

Dec. 26, 1972 W. C. LESTER ET AL 3,707,452

ELONGATED ELECTRODE AND TARGET ARRANGEMENT FOR AN RF SPUTTERING APPARATUS AND METHOD OF SPUTTERING

Filed Jan. 22, 1970 7 Sheets-Sheet 6

United States Patent Office 3,707,452

Patented Dec. 26, 1972

3,707,452

ELONGATED ELECTRODE AND TARGET ARRANGEMENT FOR AN RF SPUTTERING APPARATUS AND METHOD OF SPUTTERING

William Carl Lester, Hopewell Junction, Carlo Nuccio, Poughkeepsie, and Ernest S. Ward, Wappingers Falls, N.Y., assignors to International Business Machines Corporation, Armonk, N.Y.

Filed Jan. 22, 1970, Ser. No. 4,825
Int. Cl. C23c *15/00*
U.S. Cl. 204—192 36 Claims

ABSTRACT OF THE DISCLOSURE

An RF sputtering apparatus has an elongated hollow cylindrical target surrounding an elongated cylindrical cathode to shield the cathode from a partially evacuated chamber in which the target is disposed. An elongated hollow cylindrical anode is disposed in surrounding relation to the target. The target is spaced from the cathode so that cooling of the target may occur by dielectric coolant flowing therebetween with the dielectric coolant also transferring RF power to the target from the cathode when RF power is applied between the cathode and the anode. In an extension to continuous mode deposition (as opposed to batch mode deposition), substrates can have varying thicknesses of material deposited thereon from the target under the same sputtering conditions by moving each substrate into the chamber for support on the inner surface of the anode, rotating the anode about the target at a constant velocity, and then removing each substrate after a period of time. The amount of time that each of the substrates is supported on the anode determines the thickness of the deposited material on the substrate.

The fundamental process of sputtering, involving exposure of the material to be sputtered (the "target") to bombardment by ions in a suitable pressure gaseous glow discharge and thereby causing it to be impact-eroded and deposited upon an object (substrate) to be coated, is established in the state of the art. The sputtering of metallic substances (metal "target"), employing either high frequency (RF) or direct-current excitation applied to the metal "target" electrode, is well known. The successful application of the basic process of sputtering to dielectric materials (dielectric "targets"), requiring the application of only high frequency (RF) alternating-current excitation to a metal electrode that adjoins the dielectric target, also is known in the state of the art.

This invention particularly relates to a significant improvement in RF sputtering of dielectrics, based upon a unique combination of sputtering geometry (arrangement of electrodes, associated magnetic field means, and internal tooling) and a novel cathode-target structure (assembly). This combination uniquely defines the ideal diode system for dielectric sputtering featuring increased sputtering efficiency, extension of operating gaseous glow discharge pressure range (both lower and upper), inherently large substrate batch capacity with relatively small system size, lower substrate temperatures via decreased direct high-energy electron bombardment, and reduced restrictions on upper limit magnitude of RF power usable.

In U.S. Pat. 3,369,991 to Davidse et al., there is shown an apparatus using RF power to sputter a dielectric material on a substrate. In the aforesaid Davidse et al. patent, two planar eelctrodes (the cathode-target and anode) are geometrically arranged with respect to each other in a parallel relationship.

The cathode-target of the aforesaid Davidse et al. patent consists of a solid metal disc (with internal cooling) to which is firmly attached (by soldering or epoxying or clamping) the dielectric target (solid disc). This firm physical contact of the dielectric target to the metal electrode (to which the RF voltage for sputtering is applied), found necessary for proper cooling of the dielectric target during sputtering, also provides for holding the target (in the downward or side-way deposition mode) as well as RF voltage transfer from the metal cathode to the dielectric target. These two electrodes (cathode-target and substrate holder anode) are physically placed in an evacuated chamber which is backfilled with the desired sputtering gas to pressures in the low micron range.

Application of the RF voltage to the metal cathode then activates the gaseous discharge and sputtering mechanism. The metal electrode within the process chamber, being naturally exposed to the gaseous discharge, also would be sputtering and cause undesired and intolerable film contamination. The prevention of the metal cathode sputtering requires an "anti-sputtering shield" (also called cathode-shielding).

The cathode-shield is a metal piece machined to conform to the metal cathode geometry so as to completely cover all exposed surfaces of the metal cathode upon being placed around the metal cathode and provide a fairly uniform spacing between all points on the inner surface of the same cathode-shield and the outer surface of the metal cathode. This spacing between the cathode-shield and the metal cathode is critical in that it must be "small enough" to suppress the gaseous discharge at the otherwise exposed metal cathode surfaces but large enough that a significant capacitive coupling of the RF voltage input to electrical ground does not occur. This same spacing is "small enough" only if it is smaller than the thickness of the space charge sheath formed at the target surface (inherent in the RF gaseous discharge mechanism) which in turn is inversely proportional to the pressure of the sputtering gas. Therein lies an inherent restriction to low pressure operation (about twenty microns or less).

In the copending patent application of Pieter D. Davidse et al. for "Method and Apparatus for Coating a Substrate by Utilizing a Hollow Cathode Effect with RF Sputtering," Ser. No. 715,804, filed Mar. 25, 1968 now U.S. Pat. No. 3,627,663 of December 1971, and assigned to the same assignee as the assignee of the present application, there is shown an improvement of the aforesaid Davidse et al. patent. In the aforesaid Davidse et al. application, the requirement for utilization of a shield with the target in the vicinity of the target electrode is eliminated within a limited range of process parameters such that the glow discharge is confined to the space internal to the target.

In one embodiment of the aforesaid Davidse et al. application, an elongated target is arranged with a cylindrical shape and surrounded by an elongated cathode having a cylindrical shape with the target having a smaller effective area than the cathode. The target and cathode are placed within an evacuated chamber in which the base plate of the evacuated chamber forms the anode of the RF sputtering apparatus.

Because of the target surrounding the substrates, the cylindrical configuration of the aforesaid Davidse et al. application does not render itself to depositing a film from the target on a relatively large number of substrates simultaneously because of the limited number of positions in which substrates can be positioned within the target. In fact, the cylindrical configuration of the aforesaid Davidse et al. application utilizes a tape or wire to move through the target for obtaining the greatest substrate area for disposition.

There would be no way in which a plurality of substrates could be disposed within the target except by mounting a structure within the target. Since the anode is mounted exteriorly of the target and cathode, there is no convenient means in which to dispose any mounting structure within the target without having either an electrical conduction thereto if the support is metallic or sputtering of the support if it is a dielectric. Thus, the cylindrical configuration of the aforesaid Davidse et al. application does not lend itself to any type of deposition of a relatively large number of substrates at the same time.

Furthermore, even if a plurality of the substrates could be mounted within the target, the cylindrical cathode and target configuration of the aforesaid Davidse et al. application requires the target to have a relatively large inner diameter to accommodate a plurality of substrates. However, as the size of a target increases, it becomes more difficult to obtain the desired high purity of the material of the target.

The present invention is an improvement over the aforesaid Davidse et al. application by allowing a plurality of substrates to be simultaneously coated with a film from a target. In the present invention, the target and the cathode are elongated and have a cylindrical configuration but the target surrounds the cathode so that the outer surface of the target is sputtered to deposit the material on the substrates.

Additionally, the present invention surrounds the target with a cylindrical shaped anode, which has the same axis as the cathode and the target. By using the inner surface of the surrounding anode as the support for the substrates, a large number of substrates may have material form the target sputtered thereon at the same time whereby a relatively small target may be employed to produce a film of substantially the same thickness on each of the plurality of substrates. Thus, the present invention overcomes the problem of needing a large target area to sputter on a relatively large number of substrates so that the desired high purity of the material of the target can be obtained.

Furthermore, the arrangement of the present invention results in a large substrate capacity with a relatively small size sputtering system. Thus, the cost for sputtering each of the substrates is reduced in comparison with previously available sputtering apparatuses.

When using the parallel-plate geometry of the aforesaid Davidse et al. patent, there is a significant edge loss of sputtered material; this is only reduced by decreasing the spacing between the target and the substrate hold anode. While any desired electrode spacing between the cathode-target and the anode can be mechanically made, the gaseous discharge mechanism requires the pressure to be increased as the spacing between the cathode-target and the anode is decreased. However, any significant pressure increase to decrease the significant edge loss is opposed by the restriction to low pressure operation that is imposed due to the spacing of the cathode and the cathode-shield.

Furthermore, at higher operating pressures in the parallel-plate geometry such as above twenty microns, for example, significant back scattering occurs. This further reduces the amount of sputtered material deposited on the substrates.

In the aforesaid Davidse et al. patent, a magnetic field is applied to increase ionization efficiency in the gaseous discharge by increasing the length of the electron path in the spacing between the cathode-target and the anode.

The electrodynamics of the gaseous discharge in the parallel-plate geometry of the aforesaid Davidse et al. patent permits only a longitudinal magnetic field, which has its field lying parallel to the electric field between the two planar electrodes, to be applied.

The effectiveness of the magnetic field, which is applied in the Davidse et al. patent, depends solely upon collisions in the discharge to give the electrons velocity vectors in a direction at some angle other than 0° to 180° with respect to the electric field lines. This arrangement represents the least effectiveness of an externally applied magnetic field.

The interaction of this magnetic field with the electric field lines, which are caused by the shield at the outside edge of the cathode and target, produces an undesirable, significant distortion of the deposition rate across the substrate holder so that it is not uniform. To obtain a flat thickness deposition distribution within tolerable limits requires an empirical, interrelated adjustment of the shield configuration, the pressure level, the interelectrode spacing between the cathode-target and the anode, and the magnetic field magnitude. This critical adjustment for uniform and reasonably high deposition rate becomes more difficult as the parallel-plate geometry of the aforesaid Davidse et al. patent is upscaled to accommodate large number of substrates for deposition at the same time.

Furthermore, the magnetic field enhances high energy electron bombardment of the substrates when used as shown in the aforesaid Davidse et al. patent. This is conducive to high temperatures of the substrate and possible radiation damage to a semiconductor device on the substrate or to the film deposited on the substrate.

This magnetic field also enhances sparking and flaking, which is the breaking off of the film deposited on exposed surfaces. This is not compatible with good quality film deposition and process control.

Additionally, the apparatus of the Davidse et al. patent inherently possesses a large amount of "wall surface area" (i.e., electrically grounded metal surface area other than the substrates that is exposed to the gaseous discharge), which provides electrical capacitances that are detrimental to process optimization. This problem becomes aggravated as the electrode sizes are increased to handle larger quantities of substrates.

The present invention eliminates the shortcomings and problems associated with dielectric sputtering in the parallel-plate geometry by, in the first place, employing a uniquely different geometry, i.e., the cylindrical coaxial geometry. This novel geometry for dielectric sputtering application features two cylindrical electrodes. These cylindrical electrodes (the cathode-target and substrate holder anode) are concentrically placed as in a cylindrical capacitor with the inner cylinder being the cathode-target combination and the outer cylinder being the substrate holder anode.

Deposition of the sputtered dielectric material occurs on the inner surface of the outer cylinder where the substrates are mounted. The compatability of this geometry to large substrate batch capacity is readily notable. This cylindrical geometry is compatible with the application of a transverse magnetic field (field lines perpendicular to the radial electric field lines in the annular interelectrode space between the concentric cylindrical electrodes) which provides the maximum effectiveness of an externally applied magnetic field toward increased ionization efficiency in the gaseous discharge.

In the present invention, the anode preferably functions as the outer wall of the sputtering chamber. As a result, since the substrates are disposed on the inner surface of the anode that functions as the outer wall of the sputtering chamber and because of the use of anode-end-termination members (AET's), there is an absence of any "wall surface area" that provides electrical capacitances detrimental to processing optimization. These AET's metal and/or dielectric configurations placed at either or both ends of the cathode-target, define the cylindrical sputtering annular volume, appropriately shape the electric field lines near the ends of the cathode-target, and, thus, define (together with the cathode-target and substrate-holder anode) an ideal diode system wherein theoretically predictable, optimum diameter ratio of substrate-holder anode to target permits straightforward control of sputtering at various surfaces exposed to the gaseous discharge and sound approach to upscaling.

Because of the arrangement of the anode coaxially with the target and in surrounding relation thereto, the present invention is capable of handling relatively large quantities of substrates for deposition of the target material thereon at the same time. In the present invention, there is no problem in increasing the length of the target, the cathode, and the anode to accommodate larger number of substrates therein at the same time.

It has previously been suggested in an article entitled "Cathode Sputtering in a Magnetic Field" by F. M. Penning and J. H. Moubis (Natuurkundig Laboratorium der N.V. Philips' Gloeilampenfabrieken Eindhoven, Holland) on pages 41 to 56 of the paper presented at a meeting of Dec. 30, 1939 by Professor G. Holst to surround a cylindrical shaped metallic cathode by a cylindrical shaped anode and apply DC voltage therebetween to sputter the metal of the cathode on a substrate supported between the cathode and the anode. In the aforesaid Penning et al. article, the cathode is formed of the metal and serves as the target, which is to be deposited, or a target of the metal, which is to be deposited, is fitted on the cathode and in contact therewith.

However, the mere replacement of the target of metal with a dielectric material would not produce a satisfactory apparatus for RF sputtering a dielectric material on a substrate. This is because the previously suggested RF sputtering apparatuses have mounted the dielectric target on the cathode by snugly fitting it thereon or soldering or epoxying the target to the cathode. This arrangement has been necessary to apply an RF voltage (instead of the DC voltage) to the target from the cathode, physically support the target, and provide sufficient heat transfer from the target.

Since the target must be formed of a different material than the cathode because the material of the cathode must be an electrical conductor while the target must be a dielectric, the expansion rates of the two materials are substantially different. As a result of heating due to the RF power applied during sputtering, the target does not expand at the same rate as the cathode. This can result in breaking of a target unless the temperature is maintained relatively low. Therefore, since the metallic cathode has a higher rate of expansion than the dielectric target, the expansion of the cathode with the target mounted directly thereon in the manner shown in the aforesaid Penning et al. article would result in the target breaking.

This problem of the target breaking due to the difference in the expansion rates of the materials of the target and the cathode was not present in the aforesaid Davidse et al. application or the aforesaid Davidse et al. patent because of the mounting arrangements. In the aforesaid Davidse et al. application, the mounting of the cathode in surrounding relation to the target without physical, firm bonding of the cathode to the targe allows the cathode to expand outwardly away from the target so that it will not cause breaking of the target, which is expanding at a lower rate. There is, however, the lack of any efficient heat transfer from the target so that this arrangement is inherently restricted to low-power operation if significant heating of the substrates from target radiation is to be avoided.

In the aforesaid Davidse et al. patent, the target is merely mounted on a planar surface of the cathode so that expansion of the cathode merely causes movement of the target in the same direction without any problem. Inherent in this arrangement is lack of efficient heat transfer from the target and lack of optimum RF transfer to the target.

Additionally, if the target is secured to the cathode by solder or epoxy, the maximum target temperature must be maintained below the melting point of the solder or the disassociation temperature of the epoxy. In either arrangement, the temperature of the target must be maintained at a relatively low temperature depending upon the material used to bond the target to the cathode.

While the solder, for example, is an efficient heat and electrical transfer medium to the target from the cathode, air-pockets or voids can be produced in the solder interface if considerable care is not exercised during the bonding process. This problem becomes aggravated as the target becomes larger. Thus, there is the possibility of a reduction in the efficiency of the heat and electrical transfer of the solder with production of hot-spots conductive to target breakage.

Furthermore, as the size of the target increases, it is necessary to increase the pressure of the water, which is circulating within the cathode in the structure of the aforesaid Penning et al. article or in the aforesaid Davidse et al. patent, to obtain the necessary cooling of the target so as to be able to utilize the desired RF power. However, this high water pressure may cause deflection of the cathode, which has the target bonded thereto. As a result of the deflection of the cathode, the target deflects, and it can break.

Accordingly, for the foregoing reasons, the mere replacement of the metallic target in the aforesaid Penning et al. article by a dielectric target would not produce a satisfactory apparatus for sputtering a dielectric material on a substrate.

Furthermore, if the target were mounted on the cathode by the snug fit or solder or epoxy, the cathode and the target would have to be formed to extremely close tolerances during fabrication to produce this. Even with these desired close tolerances that increase costs substantially, the target breakage problem, due to the different rates of expansion, would still exist.

The present invention overcomes the problem of how to practically mount the target on the cathode and obtain cooling thereof by mounting the target in spaced relation to the cathode. Thus, it is not necessary to have close tolerances, and the problem due to the different coefficients of expansion of the materials of the target and cathode is eliminated.

Furthermore, the present invention provides a uniform thermal control of the target by utilizing heat transfer means between the target and the cathode that also will efficiently transfer the RF voltage from the metal cathode to the dielectric target. Thus, the temperature of the target may be maintained at a relatively low temperature while still obtaining a relatively high sputtering rate due to relatively high RF power.

In one embodiment of the present invention, the heat transfer means includes the circulation of a high dielectric coolant between the cathode and the target with the coolant providing an efficient capacitive coupling of the RF signal from the cathode to the target. In another embodiment of the present invention, the heat transfer means comprises placing the gap between the target and the cathode under a vacuum with the cathode having a coolant circulating through it. In this manner, heat is transferred by radiation from the target to the cathode, which is cooled, and the vacuum gap also efficiently transfer the RF energy from the cathode to the target.

In still another embodiment of the present invention, the heat and RF transfer means comprises placing a liquid metal such as gallium, for example, in the gap between the metal cathode and target. Furthermore, any mechanical contact of metal cathode to target inner wall via springy fingers or other means that does not cause rigid connection of the metal cathode to the target and still provide sufficient thermal control of and efficient RF transfer to the target may be employed.

As previously mentioned, the coaxial arrangement of the cathode, the target, and the anode of the present invention allows a magnetic field to be readily applied transversely to the electrical field. While this has previously been suggested in a DC sputtering system by the aforesaid Penning et al. article, this highly efficient use of a magnetic field has not previously been available in an RF sputtering apparatus. As previously mentioned, the magnetic field has been applied parallel to the electrical field between the two planar electrodes.

The present invention also contemplates the capability of controlling the temperature of the substrates separately from the anode. This is accomplished by utilizing a coolant to cool the anode so that the temperature of the substrates is not raised by the anode.

Furthermore, the utilization of the magnetic field in the transverse direction to the electrical field deflects the electrons from radial travel to the anode into cycloidal travel around the cathode-target so that more electrons are retained in the glow discharge. This not only provides higher ionization efficiency but also reduces high-energy electron bombardment of the substrates to inherently provide lower substrate temperatures than in the prior apparatuses.

By using the cylindrical and coaxial arrangement of the cathode, the target, and the anode, the present invention has particular utility in a continuous sputtering process. Thus, the present invention can mount the anode for rotation so that the substrates, which are supported on the anode, can be moved into position for support by the substrate and rotated for a predetermined period of time about the target and then removed therefrom. This enables various substrates to have different thicknesses of a film deposited thereon without any change in the deposition conditions for any of the substrates.

By this arrangement, a large number of substrates can be processed in a relatively short period of time and in a relatively small size system. Furthermore, this arrangement can be automatically controlled.

An object of this invention is to provide a unique cathode-target assembly for a sputtering apparatus.

Another object of this invention is to provide a method and apparatus for RF sputtering in which there is no requirement for a cathode shield.

A further object of this invention is to provide sputtering compatible with high pressure operation, at 200 microns or above (still operable at low pressures—down to the $10^{-4}$ torr range), where electron energies will be lower (hence, lower substrate temperatures and radiation damage) and deposition rate will be high.

A still further object of this invention is to provide a cathode-target assembly for an RF sputtering apparatus in which the RF power may be capacitively or directly coupled from the cathode to the target with the target spaced from the cathode.

Yet another object of this invention is to provide a high throughput sputtering system with small physical size featuring inherently much less "backscattering" at high pressures, much less edge-loss of sputtered material, and large substrate batch capacity as compared to systems of the parallel-plate sputtering geometry.

Still another object of this invention is to provide a method and apparatus for continuously sputtering a relatively large number of substrates.

A still further object of this invention is to provide a method and apparatus in which a large number of substrates may be sputtered under the same sputtering conditions with varying thicknesses of the material being sputtered on different substrates.

Yet another object of this invention is to provide a method and apparatus for continuously processing substrates in a vacuum at different times under the same processing conditions.

A yet further object of this invention is to provide a method and apparatus for RF sputtering in which an external magnetic field may be applied transversely to the electric field between the cathode-target assembly and the anode of the sputtering apparatus.

Still another object of this invention is to employ a transverse magnetic field to reduce direct, high-energy electron bombardment of the substrates and thereby lower substrate heating and radiation damage while increasing ionization efficiency (hence, deposition rate).

A still further object of this invention is to provide suitable physical and electrical end-configurations for the cathode-target and process volume to be called anode-end-termination members (AET's).

The foregoing and other objects, features, and advantages of the invention will be more apparent from the following more particular description of the preferred embodiments of the invention as illustrated in the accompanying drawings.

Figure 1A:
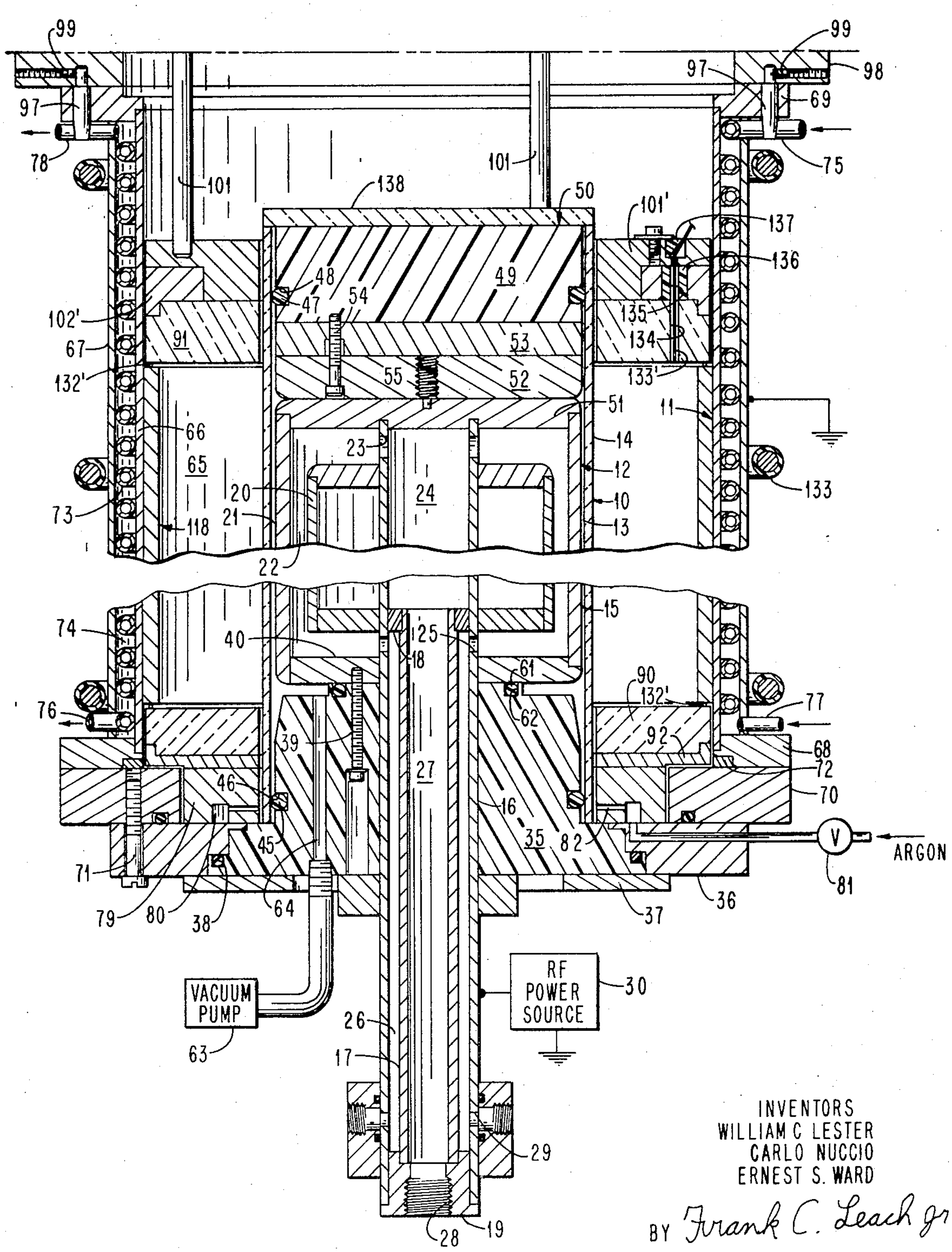
FIGS. 1A and 1B are a vertical sectional view of one form of cathode-target assembly of the present invention and the associated apparatus.

Referring to the drawings and particularly FIG. 1A, there is shown a cathode-target assembly 10 mounted in coaxial relation with a cylindrical shaped anode 11 and disposed in a vertical mode. The cathode-target assembly 10 includes an elongated cathode 12 of cylindrical shape and a cylindrical shaped target 14 disposed in spaced relation to the cathode 12 to form an annular space or gap 13 therebetween. The cathode 12, which is preferably formed of copper, includes a body 15 and a tubular extension 16 to which the body 15 is fixed.

The tubular extension 16 has an inner tube 17 disposed in its lower end and supported therein. The upper end of the inner tube 17 is fixed to a spacer ring 18, which is fixed to the inner surface of the tubular extension 16, and the lower end of the inner tube 17 is secured to a cap 19, which also is fixed to the tubular extension 16.

The body 15 of the cathode 12 comprises an inner shell 20 and an outer shell 21 in spaced relation to the inner shell 20. The mounting of the outer shell 21 in spaced relation to the inner shell 20 of the cathode body 15 produces a passage 22 therebetween with one end communicating through ports 23 in the tubular extension 16 with axial bore 24 of the tubular extension 16. The other end of the passage 22 communicates through ports 25 in the tubular extension 16 with an annular passage 26, which is formed between the inner surface of the tubular extension 16 and the outer surface of the inner tube 17.

Accordingly, by supplying a coolant to axial bore 27 of the inner tube 17 through a passage 28 in the cap 19 and removing coolant from the passage 26 through ports 29 in the tubular extension 16 of the cathode 12, the cathode 12 may be cooled. Because the target 14 is spaced only a slight distance from the cathode body 15, maintaining the cathode body 15 at a desired low temperature results in the target 14 having a relatively low temperature. This is due to heat radiation between the outer shell 21 of the body 15 and the target 14 through the gap 13.

At the same time, when RF power to the cathode 12 is supplied from an RF power source 30, which is connected to the cathode 12, the relative small gap 13 between the inner surface of the target 14 and the outer surface of the cathode body 15 provides an effective capacitance therebetween and in series with the capacitance of the target 14 so that the RF voltage, which is applied to the cathode body 15, is effective at the outer surface of the target 14.

The cathode 12 is supported by an electrically insulating cap 35, which is supported within a mounting plate 36 and secured thereto by a clamping ring 37. An O-ring 38 is disposed between stepped surfaces of the cap 35 and the mounting plate 36.

The cathode 12 is secured to the insulating cap 35, which is preferably formed of Teflon, by screws 39 (one shown), which extend into a lower end wall 40 of the outer shell 21 of the cathode body 15. The insulating cap 35 has a snug fit with the tubular extension 16 of the cathode 12 and has the cathode 12 resting on its upper surface.

The target 14, which is preferably a dielectric material such as quartz, for example, is supported in spaced relation to the cathode 15 by the insulating cap 35 and has its lower end supported on the cap 35. An O-ring 45 is disposed within an annular groove 46 in the cap 35 and cooperates with the inner surface of the target 14 to retain the target 14 in position on the cap 35 and form a seal with the target 14.

The upper end of the target 14 has its inner surface cooperating with an O-ring 47, which is disposed in an annular groove 48 in a Teflon member 49 of a body 50 that is secured to upper end wall 51 of the cathode body 15. This arrangement enables the upper end of the target 14 to be supported and a seal to be formed therewith.

The body 15 not only includes the Teflon member 49 but also members 52 and 53, which are preferably metal. Screws 54 connect the members 49, 52, and 53 of the body 50 to each other. The body 50 is secured to the upper end wall 51 of the cathode body 15 by having the member 52 threaded on a threaded stud 55, which is secured to the end wall 51 of the cathode body 15.

With an O-ring 61 disposed in an annular groove 62 in the end insulating cap 35 and engaging the outer surface of the end wall 40 to form a seal therebetween, there is formed a sealed chamber between the target 14, the cathode body 15, and the cap 35. By applying a vacuum to the sealed chamber from a vacuum pump 63 through a passage 64 in the cap 35, the capacitance coupling of the RF power to the target 14 is increased. This also correlates the pressure on the inner surface of the target 14 with the reduced pressure on the outer surface of the target 14 since the outer surface of the target 14 forms part of a sputtering chamber 65 with the anode 11.

The anode 11 includes an inner cylindrical member 66 and a spaced outer cylindrical member 67. The lower end of each of the inner cylindrical member 66 and the outer cylindrical member 67 is secured to a lower end plate 68 while the upper end of each of the members 66 and 67 is secured to an upper end plate 69.

The lower end plate 68 is supported on the mounting plate 36 through a spacer 70, which is secured to the upper surface of the mounting plate 38 by bolts 71. The end plate 68, which is secured to the spacer 70 by suitable means such as bolts (not shown), has a filler ring 72 therein.

The anode 11 is cooled by a counterflow arrangement. A coolant is supplied to a spiral tube 73, which is disposed within an annular space 74 between the inner cylindrical member 66 and the outer cylindrical member 67, through an inlet 75 connected to the upper end of the tube 73. An outlet 76 connects with the lower end of the tube 73 and extends exteriorly of the outer cylindrical member 67 of the anode 11.

The outer member 67 has an inlet port 77 communicating with the annular space 74 between the portions of the spiral tube 73. A coolant flows from the port 77 through the annular space 74 in the areas between the portions of the spiral tube 73 and exits through a port 78 in the outer member 67.

Accordingly, the coolant which flows through the tube 73 flows from top to bottom while the coolant which flows in the annular space 74 and between the portions of the tube 73 flows from the bottom of the annular space 74 to the top thereof. Thus, an effective cooling of the anode 11 is produced by this counterflow arrangement.

An inert gas such as argon, for example, is supplied to the sputtering chamber 65 from a manifold 79, which is supported on the insulating cap 35 and the mounting plate 36. The manifold 79 has an annular passage 80 connected to a source of argon through a control valve 81 for supply of argon to the sputtering chamber 65 by means of radial passages 82 in the manifold 79 extending from the annular passage 80.

The sputtering chamber 65 has anode end termination members 90 and 91 disposed therein between the outer surface of the target 14 and the inner surface of the anode 11. Each of the anode end termination members 90 and 91 is positioned just beyond each end of the cathode body 15.

The anode end termination members 90 and 91 are employed to contain the glow within a defined volume during sputtering by containing the glow between the outer surface of the target 14, the inner surface of the anode 11, and the faces of the anode end termination members 90 and 91 facing each other. This is accomplished through controlling the electric field lines and the RF current flow direction whereby sputtering does not occur in the chamber 65 except in the desired region.

The RF current is controlled through providing a relatively large impedance between each of the anode end termination members 90 and 91 and the target 14. This large impedance is provided by making the capacitance of each of the anode end termination members 90 and 91 as small as possible since the impedance is inversely proportional to the capacitance. This may be accomplished through making each of the anode end termination members 90 and 91 relatively thick with respect to its area since the capacitance is directly proportional to area and inversely proportional to thickness.

The anode end termination members 90 and 91 also have utility in controlling resputtering from the anode 11 and substrates supported thereon. Resputtering is proportional to the ratio of the area of the substrates to the area of the target. By selecting the material of the anode end termination members 90 and 91 or a portion thereof in accordance with the material of the target 14, the ratio of the substrate area to the target area can be varied since this varies the target area without having to vary the distance between the anode 11 and the target 14. Thus, the desired control of resputtering can be obtained in the present invention by use of the anode end termination members 90 and 91 without having to increase the distance between the anode 11 and the target 14 whereby a lower deposition rate would result. The anode end termination members 90 and 91 may be formed of a dielectric or a metal or a combination thereof.

The anode end termination member 90 is fixed to the manifold 79 through a filler ring 92. Thus, the anode end termination member 90 is fixed.

The anode end termination member 91 is moved relative to the position shown in FIG. 1A when it is desired to pump down the pressure within the sputtering chamber 65 before sputtering. By having the anode end termination member 91 retracted from the position between the target 14 and the anode 11 in FIG. 1A and into a chamber 94 (see FIG. 1B) of a housing 95, the conductance within the sputtering chamber 65 is increased for faster pump down and insures that the vacuum environment in the sputtering chamber 65 is thoroughly degassed to minimize contaminants in the system.

The pump down is produced by a vacuum pump 96, which is connected to the chamber 94 in the housing 95. The housing 95 is removably secured to the end plate 69. One suitable removable securing means comprises a pair of diametrically disposed centering pins 97, which are disposed within a base plate 98 of the housing 95 and retained therein by cooperating set screws 99. Accordingly, removal of the set screws 99 releases the housing 95 from the end plate 69.

The housing 95 has an actuating mechanism mounted on its upper plate 100 for moving the anode end termination member 91 from the position of FIG. 1A and into the chamber 94 and vice versa. The anode end termination member 91 is connected to the actuating mechanism by having three equally angularly spaced rods 101 extend upwardly from a ring 101′, which is connected to the anode end termination member 91 through an annular member 102′. The rods 101 are fixed to an isolation ring 102, which has a pair of diametrically disposed blocks 103 secured thereto with each of the blocks 103 having a shaft 104 secured thereto and extending therefrom through an opening in the top plate 100.

Each of the shafts 104 extends through a Teflon bearing 105, which is supported on the upper surface of the plate 100 and fixed thereto by screws 106. Each of the shafts 104 extends through a bellows 107, which has its lower end connected to the upper plate 100 and its upper end connected to a collar 108, which is fixed to the shaft 104 by welding, for example. Therefore, the bellows 107 expand as the shaft 104 are moved upwardly to remove the anode end termination member 91 from the position of FIG. 1A and contract as the shafts 104 are moved downwardly to return the anode end termination member 91 to the position of FIG. 1A.

The interior of each of the bellows 107 communicates with the interior of the chamber 94 through a passage 109 in the upper plate 100. This results in the interior of the bellows 107 always being at the same pressure as the interior of the chamber 94; thus, this provides a seal around the shaft 104.

The shafts 104 are connected to opposite ends of a bar 110, which has a central annular portion 111 mounted on a threaded rod 112. The rod 112 is rotatably supported in bearings on upper and lower portions of a support bracket 113, which is fixed to the upper plate 100. The portion 111 of the bar 110 is mounted on the rod 112 for longitudinal movement along the rod 112 whenever a handwheel 114, which is fixed to the rod 112, is turned to rotate the rod 112.

Figures 1B, 10, 11:
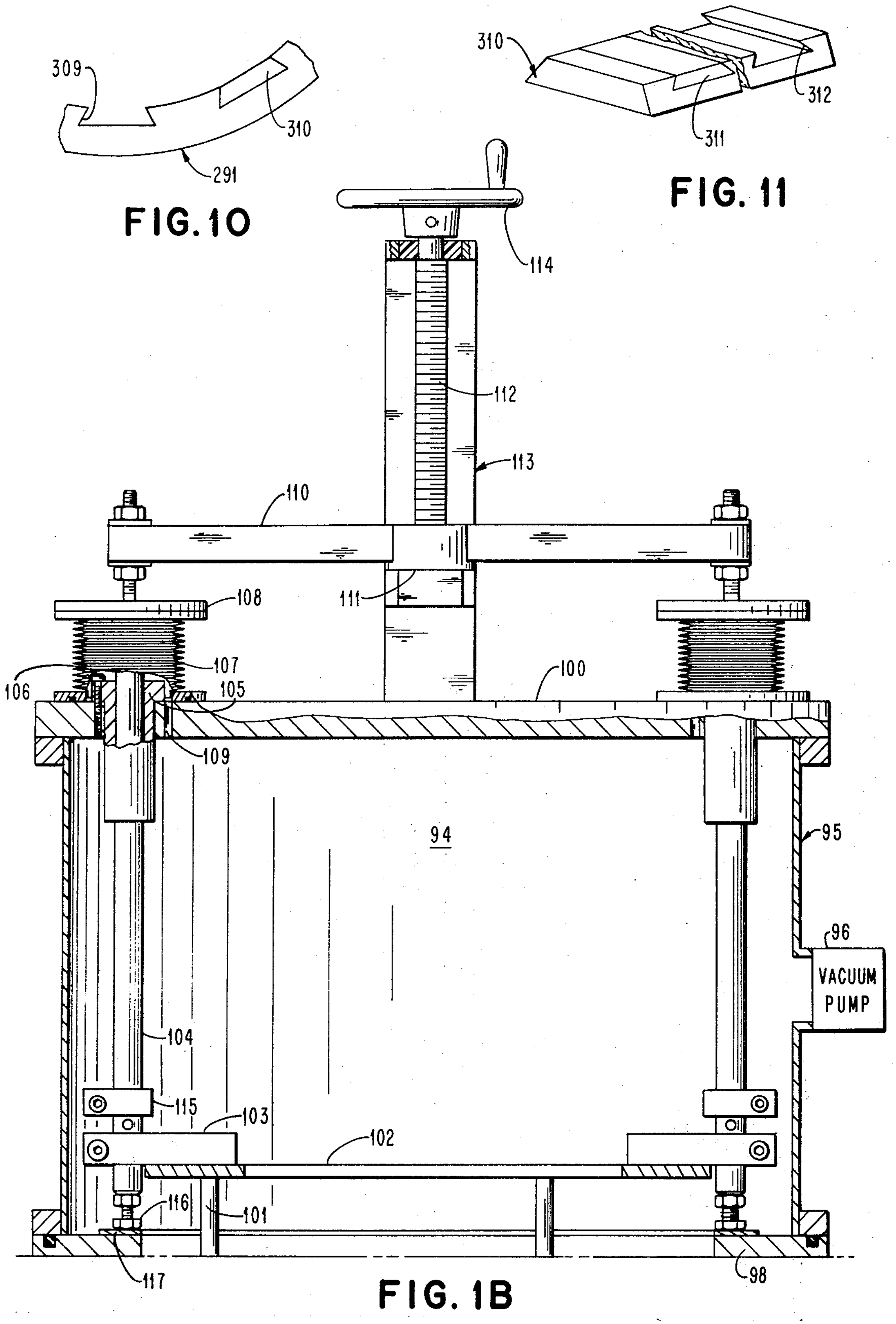
FIG. 10 is an end elevational view of a portion of the anode of the apparatus of FIG. 9 and showing longitudinal slots therein to receive substrate carriers.
FIG. 11 is a perspective view of a substrate carrier used with FIG. 10 and showing slots therein to support substrates thereon.

Accordingly, rotation of the handwheel 114 causes advancement or retraction of the anode end termination member 91. The retraction of the anode end termination member 91 from the position of FIG. 1A is stopped when a collar 115, which is mounted on each of the shafts 104, engages the lower end of the bearing 105. The movement in the opposite direction is limited by a stop 116 on the shaft 104 engaging a ring 117 on the base plate 98 of the housing 95 as shown in FIG. 1B.

A metallic basket 118, which may be formed of stainless steel or aluminum, for example, is disposed within the sputtering chamber 65 and has its outer surface circular for cooperation with the inner surface of the anode 11. The basket 118 is slidably removable from the interior of the anode 11 but has a rather snug fit therewith to insure that the basket 118 remains in the desired position within the sputtering chamber 65. However, it still must be capable of being easily removed therefrom.

Figure 2:
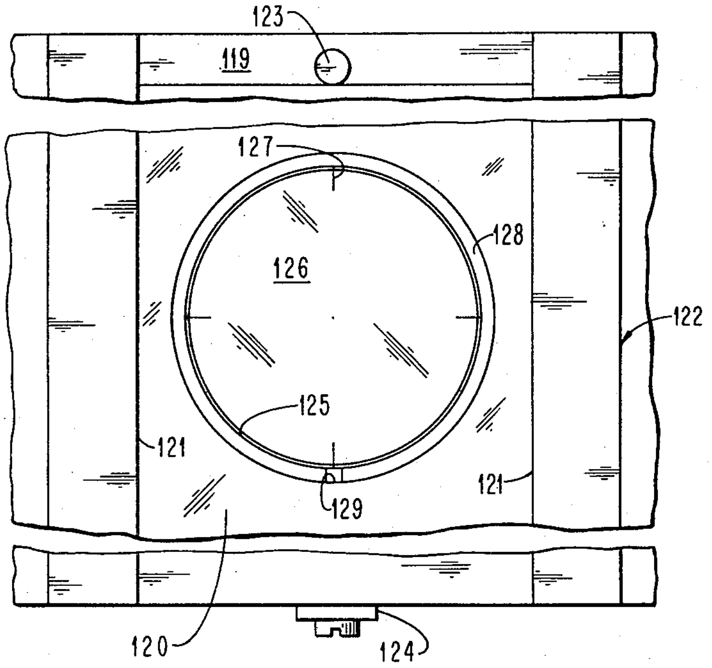
FIG. 2 is a top plan view of a portion of a substrate carrier including means to retain the substrates thereon.

As shown in FIG. 2, the basket 118 has equally angularly spaced portions 119 secured to its inner surface with each of the portions 119 having a flat upper surface on which a substrate carrier 120 can be supported by being disposed beneath flanges 121 on parallel retaining members 122, which are fixed to the portion 119. Each of the substrate carriers 120 abuts against a stud 123 on one end of the portion 119 of the basket 118 on which the carrier 120 is supported. The other end of the carrier 120 cooperates with a movable tab 124 on the portion 119 to retain the carrier 120 in position.

Each of the rectangular shaped carriers 120 has a plurality of openings 125 therein with each supporting a substrate 126. Each of the substrates 126 is retained in the corresponding opening 125 by a plurality of wires 127 on a split ring 128, which is disposed in an annular groove 129 and is readily removed therefrom and disposed therein to allow easy removal and insertion of one of the substrates 126 in the opening 125.

Figure 4:
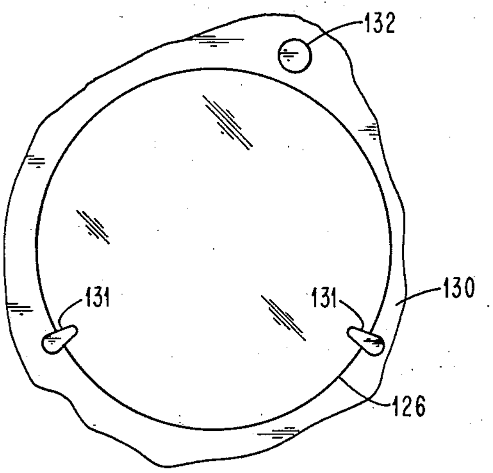
FIG. 4 is a plan view of a portion of another substrate carrier including means to retain the substrates thereon.

Instead of having the carrier 120 formed with the openings 125 therein, the basket 118 may have carriers 130 (see FIG. 4) formed with a pair of tabs 131 thereon for supporting a portion of one of the substrates 126. The carrier 130 has a post 132 fixed thereto and so located that the substrate 126 may be positioned between the post 132 and the tabs 131. However, when the basket 118 is mounted in the sputtering chamber 65, the substrates 126 will be held in position because it will be supported at two points on its lower edge as shown in FIG. 4.

It should be understood that each of the carriers 130 has a plurality of the pairs of the tabs 131 arranged thereon in longitudinal spaced relation to each other to support a plurality of the substrates 126 thereon with each pair of the tabs 131 having one of the posts 132 cooperating therewith. Each of the carriers 130 is supported on the basket 118 in the same manner as the carrier 120.

A plurality of magnetic coils 133 is disposed in surrounding relation to the anode 11. The coils 133 may be supported by any suitable non-ferrous support means (not shown). The coils 133, which are energized by direct current, are arranged in appropriate spacing to produce a magnetic field that is transverse to the electric field between the cathode 12 and the anode 11. This results in a magnetic field that is parallel to the axes of the cathode 12 and the anode 11.

As a result, the magnetic field, which is transverse to the electric field, is most effective in preventing the electrons from reaching the anode 11. This reduces the temperature of the substrates 126 since the substrates 126 are not struck by as many electrons. It should be understood that the coils 133 are not a prerequisite for satisfactory operation of the present invention although they do enable the temperature of the substrates 126 to be maintained at a lower temperature and do increase ionization efficiency.

Accordingly, when using the cathode-target assembly 10 of FIG. 1A, the target 14 completely shields the cathode 12 from the sputtering chamber 65 in which the substrates 126 have the material of the target 14 sputtered thereon when the RF power source 30 is energized. Because of the anode end termination members 90 and 91, the material is sputtered from the target 14 only in approximately the areas in which the cathode body 15 is disposed adjacent the target 14.

By using the flow of coolant through the passage 22 and relying upon heat transfer from the target 14 to the cathode body 15 through the vacuum space 13 therebetween primarily by radiation, the temperature of the target 14 is maintained relatively low. Thus, a relatively high RF power can be employed to produce a high deposition rate of the material from the target 14.

It should be understood that the space 13 could be filled with a liquid metal such as gallium, for example, or a viscous metallic paste. In such an arrangement, the structure of FIGS. 1A and 1B would be rotated 180° about a horizontal axis. Other suitable structures also may be employed.

Furthermore, by utilizing the cooling means with the anode 11, the temperature of the substrates 126 is not determined by the temperature of the anode 11 due to the RF power. Therefore, if it is desired that the substrates 126 not be subjected to a temperature beyond a certain limit so that prior processing steps of the substrates 126 are not affected, the cooling of the anode 11 permits this.

In the operation of the apparatus of FIGS. 1A and 1B, the anode end termination member 91 is moved upwardly and away from the space between the target 14 and the anode 11 by turning the handwheel 114. Then, the housing 95 is released from its connection to the end plate 69 by removing the centering pins 97 from the base plate 98 of the housing 95. As a result, the basket 118, which is filled with the substrates 126, may be inserted. The basket 118 is supported on the lower end of the anode end termination member 90 by having projecting pins 132′ engage the anode end termination member 90. The housing 95 is again connected to the end plate 69 by the centering pins 97 and the set screws 99. Then, the vacuum pump 96 is activated to pump down the sputtering chamber 65. To remove all contaminants in the sputtering chamber 65 such as water vapor, for example, heat is necessary. This is applied by ionizing the gas within the sputtering chamber 65.

Ionization of the gas within the sputtering chamber 65 is initiated through electrically energizing a wire 133′, which extends through a passage 134 in the anode end termination member 91, a passage 135 in a Teflon liner 136, which is carried in the annular member 102′ between the anode end termination member 91 and the ring 101′, and into a recess in the ring 101′ in which a Teflon insert 137 is disposed. The insert 137 has an inclined surface to retain the wire 133′ in position.

Because of the removal of the anode end termination member 91 from between the anode 11 and the target 14, the glow is not confined when removing the contaminants. As a result, a dielectric disc 138, which may be formed of quartz, for example, is secured to the upper end of the body 50 to isolate the Teflon member 49 of the body from this glow. The disc 138 also pushes against the upper end of the target 14 but without any pressure to aid in properly positioning the target 14.

After completion of pump down, the anode end termination member 91 is returned to the position of FIG. 1A. In this position, there is only a very slight clearance of about ⅛ inch between the inner surface of the anode end termination member 91 and the outer surface of the target 14 and between the outer surface of the anode end termination member 91 and the inner surface of the anode 11. This same clearance exists between the anode end termination member 90 and the target 14 and the anode 11.

As a result, the anode end termination member 91 tends to even out the pressure gradient of the inert gas, which is supplied from the manifold 79 to the sputtering chamber 65. This also aids in producing a more uniform thickness of the material deposited on the substrates 126.

Upon completion of the sputtering, the anode and termination member 91 is again retracted and the housing 95 is then again removed from the end plate 69 to allow the basket 118 to be removed. The remainder of the operation is the same as previously described.

Figure 5:
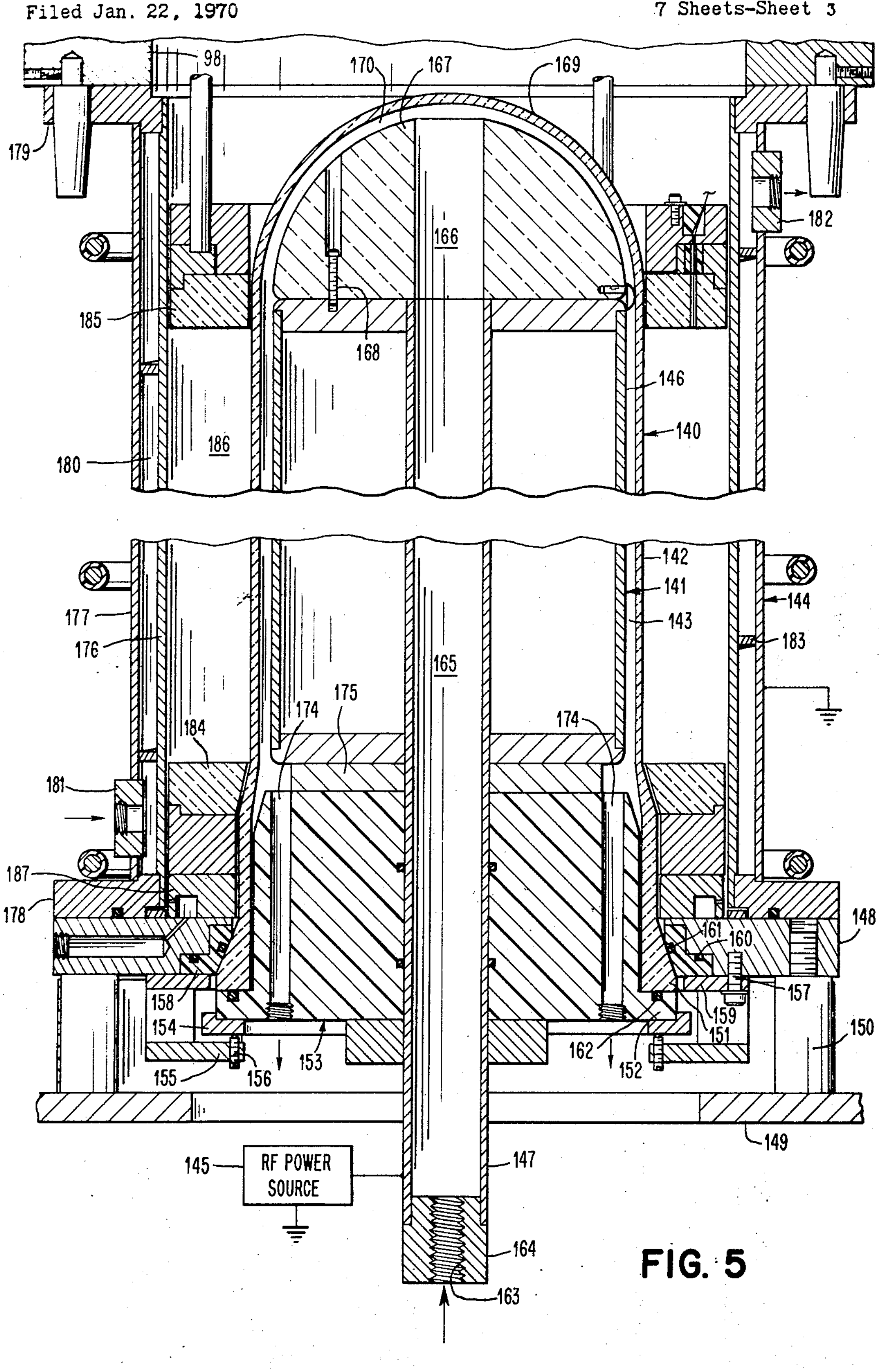
FIG. 5 is a vertical sectional view of another embodiment of the cathode-target assembly of the present invention.

Referring to FIG. 5, there is shown another form of the present invention. A cathode-target assembly 140 includes a cathode 141, which is preferably copper, having a target 142, which is preferably dielectric, disposed in spaced relation therebetween to form an annular space 143 therebetween. The cathode 141, the target 142, and an anode 144, which is disposed in spaced relation to the target 142, are coaxially mounted, and each has a substantially cylindrical shape, at least in the region in which material is sputtered from the target 142 when RF power is applied to the cathode 141 from an RF power source 145.

The cathode 141 includes a body 146 having a tubular extension 147 extending therefrom. Both are cylindrical shaped.

The cathode-target assembly 140 is supported by a vacuum ring 148. The vacuum ring 148 is supported by a mounting plate 149, which may be supported in spaced relation to the floor by support legs (not shown), for example. Studs 150 maintain the vacuum ring 148 in spaced relation to the mounting plate 149.

The target 142 has an enlarged head 151 at its lower end. The bottom surface of the enlarged head 151 rests against a flange 152 on an electrically insulating cap 153, which is preferably formed of Delrin. The cap 153 has its bottom surface resting on a ring 154, which is supported by fingers 155 through set screws 156. Thus, by adjustment of the set screws 156, the bottom surface of the cap 153 is disposed horizontal.

The fingers 155 are secured to a pressure ring 159, which is connected to the vacuum ring 148 by bolts 157. Accordingly, the cap 153 is supported by the mounting plate 149.

The enlarged head 151 of the target 142 bears against an inclined surface of an electrically insulating ring 158, which is preferably formed of Teflon. The ring 158 is retained within a recess in the vacuum ring 148 by the cooperating pressure ring 159, which is secured to the vacuum ring 148 by the bolts 157. Accordingly, the ring 158 is compressed between the enlarged head 151 of the target 142, the pressure ring 159, and the vacuum ring 148 to form a seal with a cooperating surface of the vacuum ring 148 through an O-ring 160 and with a cooperating surface of the enlarged head 151 through an O-ring 161.

The enlarged head 151 is urged into engagement with the ring 158 due to the cap 153. There is a fluid seal formed between the flange 152 of the cap 153 and the lower surface of the enlarged head 151 of the target 142 by an O-ring 162.

The target 142 is cooled by supplying a coolant through a passage 163 in a cap 164, which is connected to one end of the tubular extension 147, and then through an axial bore 165 of the hollow tubular extension 147. The coolant passes from the bore 165 into a bore 166 in a hemispherical shaped member 167, which is fixed to the upper end of the cathode 146 by screws 168.

The target 142 is similarly formed with a hemispherical end 169 to form an annular space 170 between the hemispherical member 167 and the end 169 whereby the coolant may flow from the bore 166 through the space 170 to the annular space 143. When the coolant flows through the annular space 143, it cools the target 142 by conduction. The target 142 surrounds the cathode body 146 to shield the cathode 141 from the anode 144.

In this arrangement, the coolant must be a dielectric so that it not only cools the target 142 by heat transfer but also transfers electrical energy from the RF power source 145 to the target 142 through the space 143 by capacitance. One suitable example of the dielectric coolant is deionized water.

The coolant leaves the space 143 by flowing through a plurality of passages 174 in the insulating cap 153. A ring 175 blocks the space between the cap 153 and the cathode 141.

The anode 144 includes an inner cylindrical shaped member 176 and an outer cylindrical shaped member 177. The members 176 and 177 are joined at their lower ends by an end plate 178 and at their upper ends by an end plate 179. The end plate 178 is supported on the upper surface of the vacuum ring 148 and fixed thereto. An annular space 180 is formed between the members 176 and 177 and the end plates 178 and 179.

The anode 144 is cooled by supplying coolant to the space 180 through an inlet plug 181 and removing the coolant through an outlet plug 182. A spiral member 183 is supported within the annular space 180 to direct the coolant, which can be water, for example, in a spiral arrangement about the outer surface of the inner member 176 of the anode 144. This arrangement insures that the substrates, which are supported on the inner surface of the inner member 176 by suitable means (not shown) such as the basket 118, for example, do not have their temperatures controlled by the RF power.

The apparatus has a manifold 187, which is similar to the manifold 79 of FIG. 1A, for introducing an inert gas. An anode end termination member 184 is mounted in the space between the target 142 and the anode 144 in a manner similar to that shown in FIG. 1A for the anode end termination member 90. Likewise, a retractable anode end termination member 185, which is similar to the anode end termination member 91 of FIG. 1A, is also mounted between the anode 144 and the target 142. Sputtering occurs in a chamber 186, which is formed between the target 142, the anode 144, and the anode end termination members 184 and 185.

It should be understood that the remainder of the retractable mechanism for the anode end termination member 185 would be similar to that shown in FIG. 1B. Similarly, the housing 95 also would be mounted on the end plate 179 in the same manner as it is mounted on the end plate 69 in FIG. 1B so that a vacuum may be applied to the sputtering chamber 186.

The operation of this embodiment of the invention is substantially the same as that described for the apparatus of FIGS. 1A and 1B. The primary difference is that the cooling arrangement between the target 142 and the cathode 141 relies upon the circulation of a dielectric coolant in the space 143 with the dielectric coolant also transferring the RF energy from the cathode 141 to the target 142.

Figure 6:
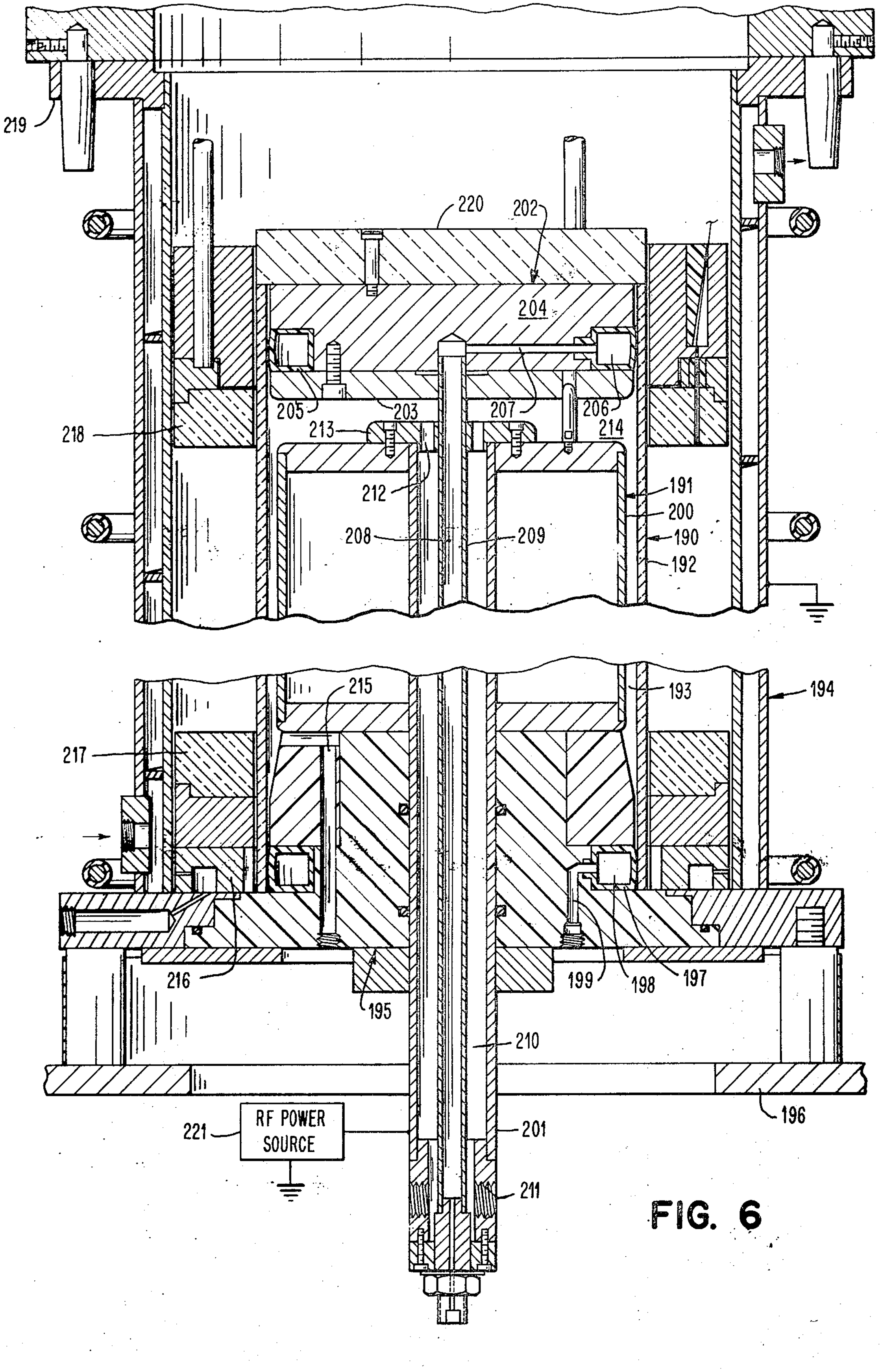
FIG. 6 is a vertical sectional view of a further modification of the cathode-target assembly of the present invention.

Referring to FIG. 6, there is shown a further embodiment of the present invention in which a cathode-target assembly 190 comprises a cathode 191 of the same structure as shown in FIG. 5. The cathode-target assembly 190 includes a target 192 mounted in spaced relation to the cathode 190 to form an annular space 193 therebetween in the manner previously shown in FIG. 5 to allow circulation of a dielectric coolant therethrough such as deionized water, for example.

The apparatus includes an anode 194, which is constructed in the same manner as that shown in FIG. 5. The anode 194 surrounds the target 192.

The target 192 is supported on an electrically insulating cap 195, which is supported on a mounting plate 196 in the same manner as the cap 35 of FIG. 1A is supported. The lower end of the target 192 surrounds the cap 195 and rests on a surface thereof.

An inflatable seal 197, which is formed of a plastic and preferably Viton, cooperates with the inner surface of the lower end of the target 192 to form a seal therebetween. A gas, which is preferably argon, is supplied to an annular chamber 198 in the seal 197 through a passage 199 in the cap 195. Accordingly, when the gas is supplied to the chamber 198, the seal 197 is inflated.

The cathode 191, which includes a body 200 and a tubular extension 201, has a body 202 secured to its upper end. The body 202 comprises a lower member 203 and an upper member 204 secured to each other. Each of the members 203 and 204 may be formed of metal or dielectric.

The body 202 supports an inflatable seal 205, which is formed of the same material as the seal 197, for cooperation with the upper end of the target 192 to form a seal therewith when gas is supplied to an annular chamber 206 in the seal 205 to inflate the seal 205. The chamber 206 communicates through a passage 207 in the body 202 with an axial bore 208 in a tube 209, which extends through the tubular extension 201 of the cathode 191. Gas may be supplied from the same source, which supplies the gas to the passage 199 in the cap 195, or from a different source to the axial bore 208 for inflating the seal 205.

The dielectric coolant may be supplied to the space 193 to cool the target 192 through being supplied to an annular chamber 210, which is formed between the outer surface of the tube 209 and the inner surface of the tubular extension 201, by means of inlet ports 211. The coolant passes from the annular passage 210 through ports 212 in a plate 213, which supports the tube 209, into a space 214 between the lower members 203 of the body 202 and the upper end of the cathode body 200. From the space 214, the coolant flows through the annular space 193 and then through a plurality of passages 215 (one shown) in the cap 195.

The apparatus has a manifold 216, which is similar to the manifold 79 of FIG. 1A, for introducing an inert gas. Anode end termination members 217 and 218 are employed and supported in the same manner as the anode end termination members 90 and 91 of FIG. 1A. Thus, the anode end termination member 218 is retractable. In the same manner as shown in FIGS. 1A and 1B, the housing 95 would be secured to an end plate 219 of the anode 194.

The body 202 has a dielectric disc 220 supported thereon in the same manner as the disc 138 is mounted on the body 50 in FIG. 1A. The disc 220 has the same functions as the disc 138.

The operation of the apparatus of FIG. 6 is the same as that described for FIGS. 1A and 1B except that the target 192 is cooled by a dielectric coolant, which also transfers the RF energy from an RF power source 221, rather than merely cooling the target and relying upon a vacuum space between the target and the cathode to cool the target by radiation. Therefore, the operation of the apparatus of FIG. 6 will not be described.

Figure 7:
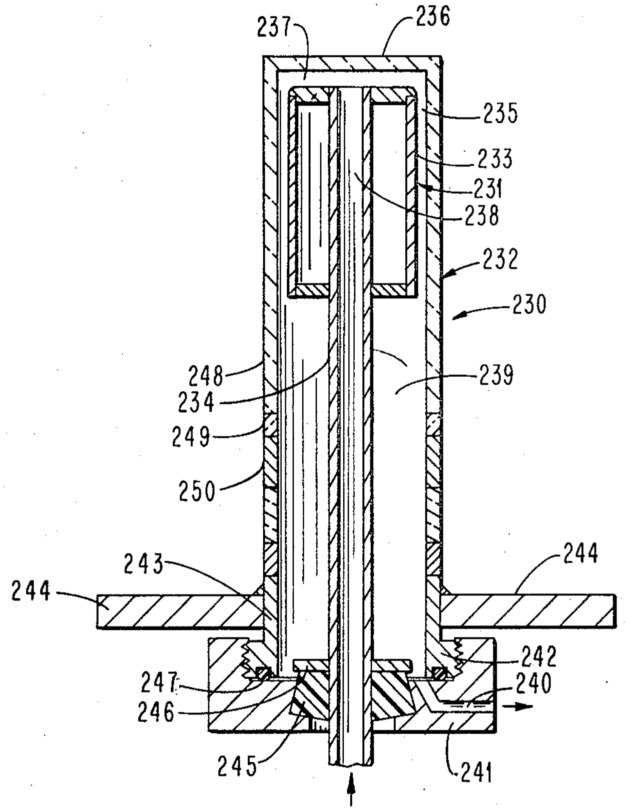
FIG. 7 is a vertical sectional view of still another form of the cathode-target assembly of the present invention.

Referring to FIG. 7, there is shown another modification of the invention in which a cathode-target assembly 230 comprises a cathode 231, which is preferably copper, and a target 232. The cathode 231 includes a body 233 having a tubular extension 234 disposed therein and extending from one end thereof.

The cathode body 233 and the target 232 are coaxially mounted and cylindrical shaped with the cathode body 233 being spaced from the target 232 to form an annular space or gap 235 therebetween. The upper end of the cathode body 233 also is spaced from an end 236 of the target 232 to provide a space 237 therebetween for providing communication between the annular space 235 and an axial bore 238 in the tubular extension 234. The axial bore 238 receives a liquid dielectric coolant.

After the coolant flows through the annular space 235, it passes through an enlarged annular space 239 between the target 232 and the cathode tubular extension 234. The coolant exits from the annular space 239 through a passage 240 in a closure nut 241.

The closure nut 241 is connected with a threaded portion 242 of a stainless steel supporting cylinder 243, which is fixed to a vacuum ring 244. The vacuum ring 244 may be secured by suitable means to a mounting plate in the same manner as the vacuum ring 148 of FIG. 5 is secured, for example, to the mounting plate 149.

When the closure nut 241 is threaded on the threaded portion 242 of the support cylinder 243, a seal 245, which is formed of a suitable compression and electrically insulating material such as Teflon, for example, engages the outer surface of the tubular extension 234 and a washer 246, which is fixed to the tubular extension 234, to form a fluid seal between the tubular extension 234 and the seal 245. The washer 246 is formed of the same material as the tubular extension 234. The seal 245 also electrically insulates the tubular extension 234, which has an RF power source connected thereto, from the closure nut 241 and the vacuum ring 244. Additional fluid sealing is obtained between the closure nut 241 and the cylinder 243 by an O-ring 247.

The target 232 is supported on the cylinder 243 by having a cup-shaped portion 248, which is formed of a dielectric material that is to be sputtered and disposed adjacent the cathode body 233, connected through a graded seal 249 to a Kovar-ceramic-Kovar cylinder 250. By using the graded seal 249, stress concentrations are avoided between the cup-shaped portion 248 of the target 232 and the cylinder 250 since the coefficients of expansions of these two materials are substantially different. The cylinder 250 has one of its Kovar rings secured to the support cylinder 243.

The anode structure has not been shown in this modification. However, it could be the same as that shown in FIG. 5 and mounted in the same manner.

Figure 8:
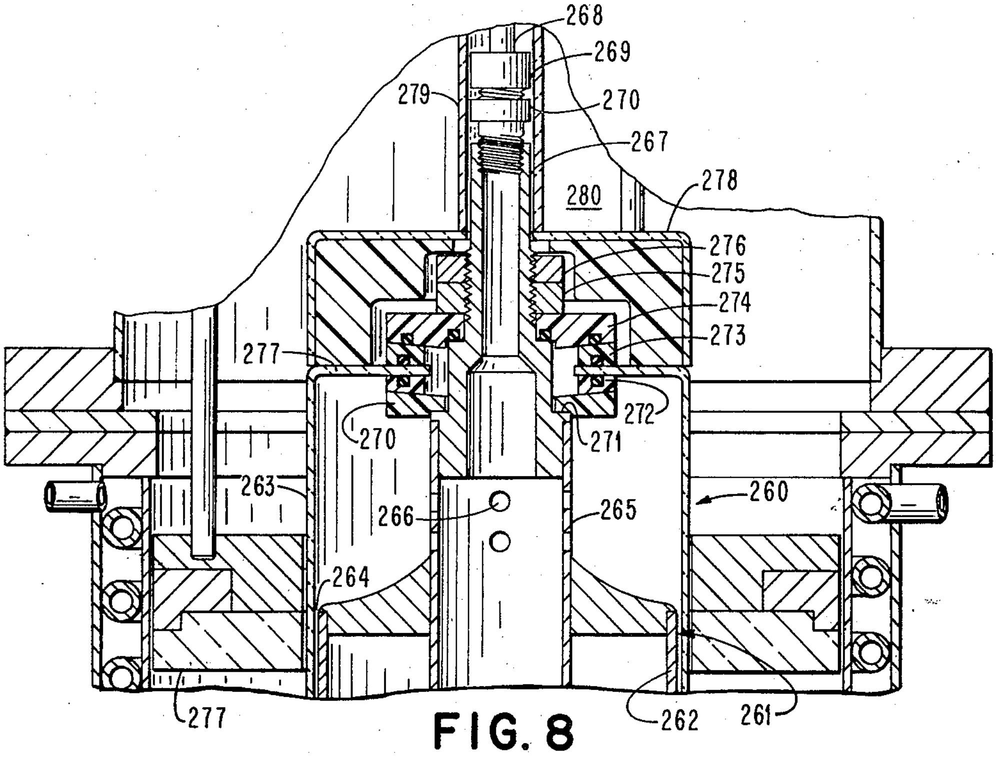
FIG. 8 is a fragmentary sectional view of a portion of a cathode-target assembly of the present invention in which the cathode has RF power connected to both ends.

Referring to FIG. 8, there is shown a portion of a cathode-target assembly 260 that may be used with the structure of FIG. 5, for example. The assembly 260 includes a cathode 261 having a cylindrical shaped body 262 which may be supported in the manner shown in FIG. 5, for example. A cylindrical shaped target 263, which is formed of a dielectric such as quartz, for example, is disposed in spaced relation to the cathode body 262 to form an annular space 264 therebetween in the same manner as shown in FIG. 5.

The cathode 261 includes a hollow tube 265 extending through the body 262 and having ports 266 therein to allow the dielectric coolant to flow from the interior of the tube 265 to the annular space 264. This produces both the desired cooling of the target 263 and the necessary capacitance between the cathode body 262 and the target 263 to transfer the RF energy to the target 263 from the cathode 261.

The cathode tube 265 has a tubular extension 267 extending outwardly beyond the end of the target 263 to have a fixed RF transmission line 268, which is a hollow tube connected to an RF source, connected thereto. The line 268 is connected to a demountable RF connector 269, which is threaded to a coupling 270 that is threaded in the end of the tubular extension 267.

This arrangement enables RF power to be applied from RF power sources to both ends of the cathode 261 since the RF power will be applied to the other end of the cathode 261 in the same manner as previously described for FIG. 5, for example. Furthermore, instead of connecting an RF power source to the fixed RF transmission line 268, the fixed RF transmission line 268 can be connected to a load, which may be variable at will.

A sealing member 270, which is formed of a suitable electrically insulating material such as Teflon, for example, abuts against a shoulder 271 of the tubular extension 267. This occurs when a sealing member 272, which engages an inclined portion of the sealing member 270, is urged thereagainst by sealing members 273 and 274 and nuts 275 and 276. The members 272, 273, and 274 are formed of a compressible electrically insulating material such as Teflon, for example. The nut 275 is threaded on the outer surface of the tubular extension 267 and bears against the sealing member 274, which urges the sealing member 273 against a flanged end 277 on the target 263.

The nut 276 is threaded on the tubular extension 267 until it abuts against the nut 275, which is engaging the sealing member 273. This compresses the sealing members 270, 272, 273, and 274.

To prevent any undesired sputtering of the metal nuts 275 and 276 and the portion of the tubular extension 267, which protrudes beyond the nuts when a retractable anode end termination member 277 is retracted, all of these areas may be enclosed by a surrounding shield 278, which is formed of a suitable dielectric material. In the preferred arrangement, the shield 278 comprises an outer cap of quartz and an inner conforming support of Teflon. If desired, the shield 278 may be fabricated solely of quartz or any other suitable material.

Furthermore, the fixed RF transmission line 268 and the portion of the tubular extension 267 beyond the shield 278 are surrounded by a shield 279. This reduces any capacitive coupling between the line 268 and vacuum pumping chamber 280 in which it is disposed.

Any of the foregoing sputtering apparatuses may be disposed in a horizontal mode or in a vertical mode in which the structure is reversed 180° from that shown. By disposing any of the foregoing sputtering apparatuses in a horizontal mode, it may be employed for continuous sputtering of a plurality of substrates. This is because a coaxial arrangement of the anode with the target and the elongated cylindrical configuration would allow substrates to enter at one end of the apparatus between the target and the anode and to exit at the other end of the apparatus. Therefore, it would only be necessary to modify any of the foregoing apparatuses to provide an entrance and an exit for substrates for there to be continuous sputtering of a plurality of substrates under the same sputtering conditions.

By continuous sputtering of a plurality of substrates under the same sputtering conditions, there is no necessity for shut down and then attempting to again establish the same conditions within the sputtering chamber as previously existed during a previous sputtering operation of substrates. Thus, the present invention enables each of the plurality of substrates to have substantially the same properties due to being sputtered under the same sputtering conditions.

Figures 9A, 9B:
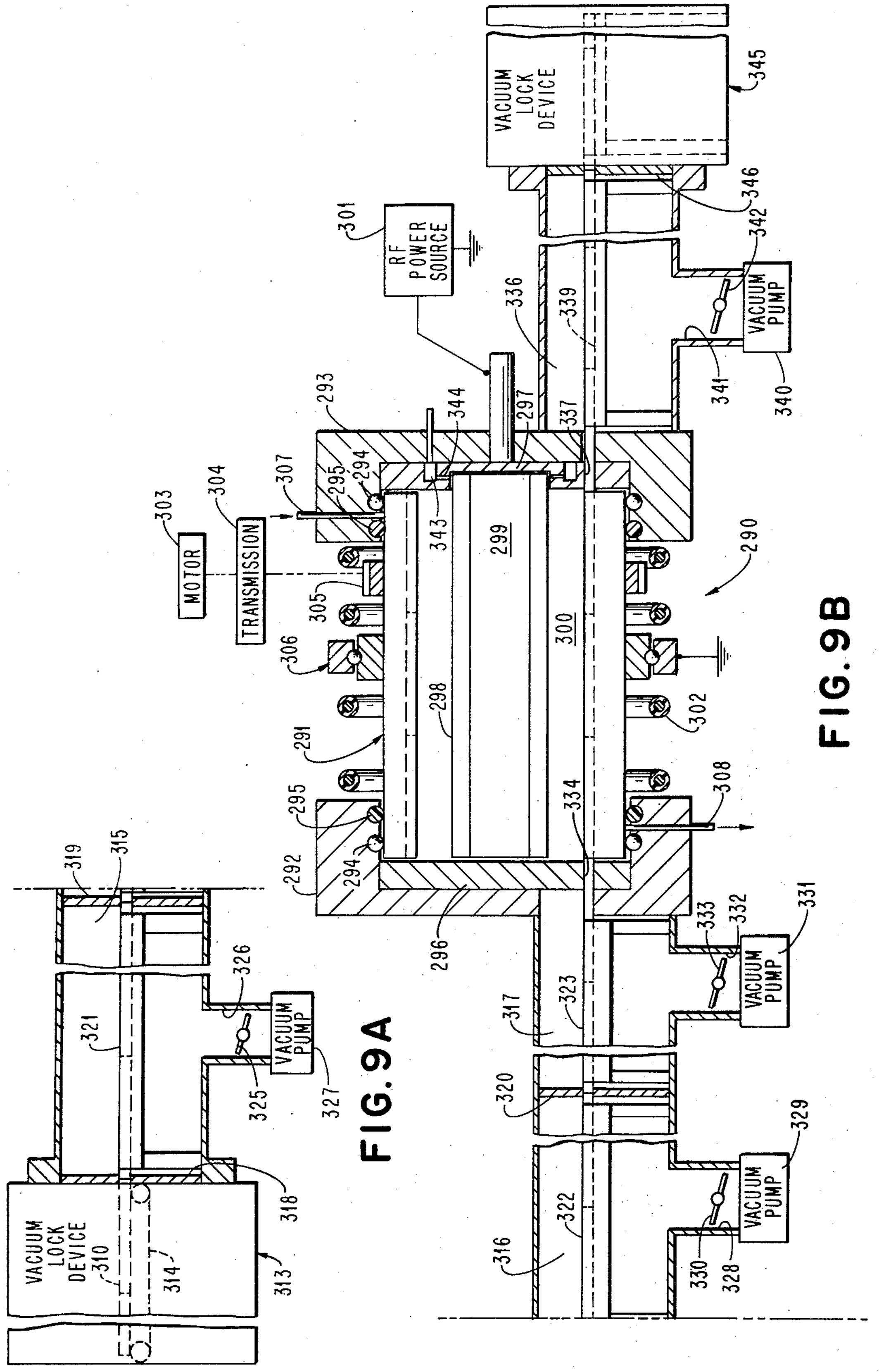
FIGS. 9A and 9B are a schematic view of a continuous process apparatus of the present invention.

Referring to FIGS. 9A and 9B, there is shown a continuous sputtering apparatus in which the cathode-target assembly of one of the foregoing apparatuses may be employed. There is schematically shown a sputtering apparatus 290 in FIGS. 9A and 9B with the apparatus including a cylindrical anode 291, which is rotatably supported in fixed end plates 292 and 293 by bearings 294. O-rings 295 form a seal between the rotating anode 291 and the end plates 292 and 293.

The anode 291 and anode end termination members 296 and 297 cooperate with a target 298, which is supported on a cathode 299, to form an enclosed chamber 300 within which sputtering occurs when an RF power source 301 is applied to the cathode 299. The target 298 may be mounted in spaced relation to the cathode 299 and cooled in any of the ways previously shown. The cathode 299 may be supported in the end plate 293 by any of the means previously shown. Both the target 298 and the cathode 299 are schematically shown.

A plurality of magnetic coils 302 is disposed in surrounding relation to the outer surface of the anode 291. The coils 302, which are energized by direct current, are arranged in a suitable configuration to apply to magnetic field within the chamber 300 that is transverse to the electrical field. The magnetic field extends in the axial direction of the anode 291, the cathode 299, and the target 298.

The anode 291 is rotated by a motor 303, which is connected to the anode 291 through a transmission 304 and an annular gear 305 fixed on the outer surface of the anode 291. By changing either the speed of the motor 303 or the ratio of the gears in the transmission 304, the speed of rotation of the anode 291 can be varied.

To supply electrical connections to the anode 291 from the RF power source 301, an electric slip ring 306 of the ball bearing type may be employed to provide a multi-point contact. This arrangement prevents high field concentration at a small area such as a single point if only a single brush contact were employed.

The anode 291 may be cooled by flowing a coolant between inner and outer walls of the anode 291 in the same manner as described for the previous apparatuses. Of course, there must be a connection to allow for rotation of the anode 291 with respect to a coolant inlet conduit 307 and a coolant outlet conduit 308.

As shown in FIG. 10, the inner surface of the anode 291 has a plurality of equal angularly spaced longitudinal slots 309 to receive substrate holders or carriers 310 therein. Each of the carriers 310 supports a plurality of substrates 311 (one shown in FIG. 11) which are to be treated within the sputtering chamber 300.

The slots 309 are formed with inclined side walls, and the holders or carriers 310 have their side walls similarly formed. As a result, the holder or carrier 310 is retained in the slot 309 even when the slot 309 is positioned above the carrier 310 whereby the carrier 310 would normally fall from the slot 309 due to gravity.

Figure 3:
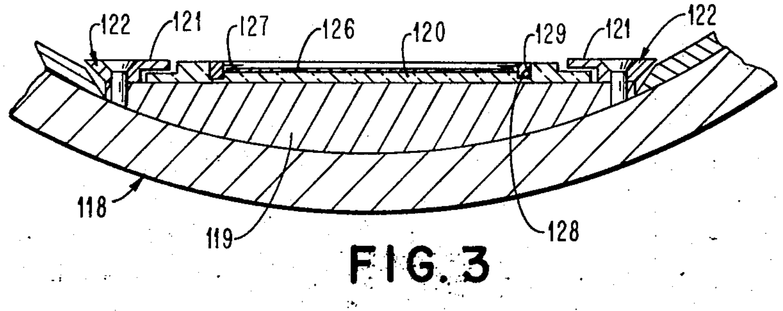
FIG. 3 is a sectional view of the carrier and the basket of FIG. 2 in which it is supported.

The substrates 311 may be supported on the carrier 310 by any suitable retaining means that will hold the substrates 311 on the carrier 310 irrespective of whether the carrier 310 is disposed above or below the substrates 311. One suitable means would be to form slots 312 (see FIG. 11) in the carrier 310 and incline the side walls in the same manner as the slots 309 in the anode 291 have their side walls inclined. Of course, the slots 312 are transverse to the substrate holder or carrier 310 to allow each of the substrates 311 to be separately supported. The retaining means also could be that shown in FIGS. 2 and 3.

To maintain the operating conditions within the sputtering chamber 300 substantially constant, the chamber 300 must be protected against loss of vacuum during the introduction of the substrate carriers 310 into the chamber 300 and removal of the substrate carriers 310 from the chamber 300. Accordingly, the substrate carriers 310 are introduced through a vacuum lock device 313. The vacuum lock device 313 may be any suitable means that has a chamber accessible to the atmosphere for reception of the carriers 310 and then capable of being reduced in pressure after closure of the chamber.

The vacuum lock device 313 has a conveyor 314, for example, on which the substrate holders or carriers 310 are mounted for movement from the reception chamber in the vacuum lock device 313 to and through chambers or compartments 315, 316, and 317. The conveyor 314 is driven by suitable means (not shown).

The chamber 315 is separated from the vacuum lock device 313 by a wall 318 and from the compartment 316 by a wall 319. A wall 320 separates the chamber 316 from the chamber 317.

The substrate carriers 310 are advanced by the conveyor 314 from the chamber in the vacuum lock device 313 onto a support track 321 in the chamber 315. The substrate carriers 310 are advanced through the chamber 315 and from the chamber 315 to the chamber 316 due to the carriers 310 being advanced by the conveyor 314 into the chamber 315. This results in the pushing of the carriers 310 within the chamber 315 on the track 321 into the chamber 316 for disposition on a support track 322. From the chamber 316, the substrate carriers 310 are advanced to a support track 323 in the chamber 317. It is not necessary for any of the tracks 321–323 to be driven since the driving of the conveyor 314 causes the carriers 310 to be continuously advanced as they are in engagement with each other.

The walls 318, 319, and 320 have openings therein through which the carriers 310 may be advanced from one of the chambers to the other. However, it is necessary to seal these openings when the carriers 310 are not being moved so that the chambers are isolated from each other. Accordingly, by selecting the length of the substrate holder or carrier 310 in cooperation with the length of each of the chambers 315–317, each of the openings in the walls 318, 319, and 320 can be blocked by the end of the carrier 310 adjacent the wall.

The chamber 315 may be used as a reverse sputtering chamber in which a final cleaning operation may be performed on the top surface of each of the substrates 311. The vacuum pressure within the chamber 315 and the nature of the atmosphere may be controlled through positioning a butterfly valve 325 in a passage 326, which connects the chamber 315 with a vacuum pump 327.

After a short cleaning treatment in the reverse sputtering chamber 315, the conveyor 314 is again actuated to advance the substrate carrier 310 from the chamber 315 to the chamber 316, which is separated from the chamber 315 by the wall 319. The chamber 316 serves as a storage chamber to hold one or more of the substrate carriers 310 therein.

The chamber 316 is maintained at the desired low pressure through connecting the chamber 316 by a passage 328 to a vacuum pump 329. A butterfly valve 330 in the passage 328 is positioned to control the vacuum within the chamber 316.

The chamber 317, which is separated from the chamber 316 by the wall 320, is maintained at the desired low pressure by means of a vacuum pump 331, which is connected to the chamber 317 by a passage 332. A butterfly valve 333 in the passage 332 is positioned to control the vacuum within the chamber 317.

The chamber 317 communicates with the enclosed chamber 300 through an opening 334 in the anode end termination member 296, which is a ring. The end of the substrate carrier 310 in the chamber 317 adjacent the enclosed chamber 300 cooperates with the anode end termination member 296, which is supported by the end plate 292, to seal the opening 334 therein so that the anode end termination member 296 is a continuous ring.

After the substrate holder 310 has been moved into the enclosed chamber 300, it exits therefrom to a chamber 336 through an opening 337 in the anode end termination member 297, which is a ring. One end of the carrier 310 in the chamber 336 and adjacent the enclosed chamber 300 fills the opening 337 so that the anode end termination member 297 is continuous.

The chamber 336 has a support track 339 therein and aligned with the opening 337 to receive the substrate holders or carriers 310 from the chamber 300. By the use of a cryogenic plate (not shown), for example, the chamber 336 is maintained at a desired low temperature to cool the substrates 311. Furthermore, a vacuum pump 340 is connected to the chamber 336 through a passage 341. A butterfly valve 342 is disposed in the passage 341 to control the pressure within the chamber 336.

Accordingly, by employing the vacuum pumps 331 and 340, the sputtering chamber 300 may have the desired vacuum pressure therein. This results in sputtering occurring under the desired pressure conditions.

An inert gas such as argon, for example, may be supplied to the interior of the enclosed chamber 300 by any suitable type of a manifold, for example. The anode end termination member 297 may have argon gas supplied to an annular passage 343 therein from a passage through the end plate 293 and from the passage 343 by radial passages 344 to the interior of the chamber 300.

The substrate holders 310 are removed from the chamber 336 into a vacuum lock device 345. This vacuum lock device 345 is similar to the vacuum lock device 313. There is a wall 346 separating the vacuum lock device 345 from the chamber 336. The wall 346 has an opening therein, which is blocked by the end of one of the substrate holders 310 in the chamber 336.

The anode 291 is driven at a relatively slow speed such as a single revolution in twenty minutes, for example. Notwithstanding this slow speed, the anode 291 has a short dwell when each of the longitudinal slots 309 in the anode 291 registers with the opening 334 in the anode end termination member 296 and the opening 337 in the anode end termination member 297. With the rotation of the anode 291 stopped for the short dwell, the conveyor 314 is activated to advance a sufficient number of the carriers 310, which are stored in the chamber 317 and equal to the number stored in the slot 309 in the anode 291, from the chamber 317 into the slot 309. Therefore, the conveyor 314 is driven sufficiently to push all of the carriers 310, which are within the slot 309 in the anode 291, out of the slot 309 and into the chamber 336.

It should be understood that the target 298 may be formed of any material that it is desired to sputter on the substrates. If formed of metal, the target 298 could be mounted directly on the cathode 299. It should be understood that the cathode 299 and the target 298 may be cooled by any suitable means (not shown). These means would be preferably those previously shown.

It should be understood that the back surface of each of the carriers 310 could be coated with a liquid metal or metallic paste such as gallium, for example, to increase the heat transfer between the carrier 310 and the anode 291. The liquid metal or metallic paste could be added as the carrier 310 passes through the chamber 317 by any suitable means such as a rotating disc positioned in a tank containing the liquid metal or metallic paste.

While the present invention has shown only a single entrance station, which is the chamber 317, and a single exit chamber, which is the chamber 336, it should be understood that there could be a plurality of entrance stations and an equal number of exit stations. For example, there could be three entrance stations and three exit stations with each being equally angularly spaced so that they would be 120° apart. This would necessitate three similar entrance and exit systems to that shown in FIGS. 9A and 9B. It also would require that the anode end termination members 296 and 297 have the same number of openings therein as the number of stations with each of the openings being aligned with one of the stations.

This arrangement of a plurality of stations would enable the substrates 311 to have a plurality of different thicknesses deposited thereon depending on the amount of time that the particular carrier 310, which has the substrates 311 thereon, is within the chamber 300. For example, the anode 291 could have twelve equally angularly spaced slots 309. With three entrance stations and three exit stations, for example, the substrates 311 could be removed from the chamber 300 after only 120° of rotation of the anode, 240° of rotation of the anode, or 360° of rotation of the anode. Of course, the substrates 311 could remain in the chamber 300 for more than one revolution with the same opportunity for removal during each revolution at 120°, 240°, or 360°, for example.

While the present invention has described the continuous processing system of FIGS. 9A and 9B as being utilized with a sputtering system, it should be understood that the continuous processing system could be utilized in any process in which it is desired to treat the substrates 311 or other members in a partial vacuum in some manner. For example, the continuous process could be employed to deposit material by evaporation, for example.

It should be understood that the continuous processing apparatus of FIGS. 9A and 9B is preferably automatically controlled. This will insure that one of the carriers 310 is properly positioned in each of the openings in the separating walls between the chambers.

While the apparatus of FIGS. 9A and 9B has merely shown the target 298 schematically mounted on the cathode 299, it should be understood that any of the cathode-target assemblies previously shown may be employed. If the apparatus of FIGS. 1A and 1B were employed, for example, it would be necessary to form a passage in the anode end termination member 90 and the filler ring 92 to allow the substrate carriers 310 to enter through such an opening. This also would necessitate an opening in the spacer 70 and in the mounting plate 36. The mounting plate 36 could be replaced by the end plate 293, if desired, or the mounting plate 36 could be fixed to the end plate 293.

The retractable anode end termination member 291 of the apparatus of FIGS. 1A and 1B would be replaced by an anode end termination member similar to the anode end termination member 90. The anode end termination member would also have an opening, similar to that in the anode end termination member 90, therein to allow the substrates to move therethrough and would be supported on the end plate 292.

It also would be necessary to modify the anode 11 so that the inner surface of the inner member 66 would have equally angularly spaced longitudinal slots therein in the same manner as the anode 291. Of course, it also would be necessary to rotatably mount the anode 11.

Because of the vacuum created by the vacuum pumps 331 and 340, the vacuum pump arrangement of FIG. 1B would not be required or employed. Thus, there could be a termination of the apparatus of FIGS. 1A and 1B, when used with the apparatus of FIGS. 9A and 9B, at the end of the anode end plate 69.

The same type of similar modifications would be necessary when utilizing the other previously described cathode-target assemblies. From the suggested revisions to the apparatus of FIGS. 1A and 1B, the modifications to the other previously described apparatuses will not be described in detail since they would readily be understood. Of course, the target 298 could be metal if desired. In this arrangement, the target 298 could be directly mounted on the cathode 299 and DC sputtering employed.

While the present invention has shown and described the various cathodes, targets, and anodes as being cylindrical shaped, it should be understood that it is not necessary for the cathodes, the targets, and the anodes to be cylindrical as long as they all have the same shape and are coaxially mounted about a single axis. Thus, each of the cathodes, the target, and the anode could have a polygonal shape such as triangular, for example, if desired.

Furthermore, the cooling of the target by heat transfer to the cathode and the transfer of RF energy to the target from the cathode may be by any suitable means. For example, instead of flowing the deionized water through the gap between the target and the cathode, the gap could be filled with a liquid metal or metallic paste having the capability of transferring RF energy.

Likewise, another means for transferring heat from the target to the cathode while transferring RF energy from the cathode to the target would be to mount the target in spaced relation to the cathode by resilient fingers, which would be on the outer surface of the cathode, to transfer RF energy. Furthermore, the resilient fingers also would transfer heat from the target to the cathode, which would have coolant circulating therethrough as in FIG. 1A, so that this could combine with radiation heat transfer from the target to the cathode through the gap, which would not have any coolant therein, to cool the target.

Since the target is preferably formed with a circular surface while each of the substrates has a planar surface, the possibility exists in some instances when the target is relatively large that equal deposition will not occur across the surface of the substrate because of the additional radial distance of the ends of the substrate to the target surface. While tests have indicated that this is not a problem with most targets of a size such as an inner diameter of 7 inches, for example, suitable means could be employed to oscillate each of the substrates on its carrier during deposition.

Thus, the substrate carrier could be formed of an outer support element and an inner movable element supported in a recess in the outer element and on which the substrate is disposed. The inner element could be biased by a spring in one direction for rotation relative to the outer element. The inner element could be retained on the outer element by a pin having its head disposed in the outer element and its body secured to the inner element after extending through an elongated slot in the outer element. A cam track cooperating with a pin on the inner element could move the inner element with respect to the outer element against the force of the spring. As a result, there would be oscillation of the inner element depending on the configuration of the cam track. In the continuous process apparatus in which the anode rotates, the cam track could be fixed and the pin ride therein as the anode rotates since the carrier would be mounted on the anode for rotation therewith.

An advantage of this invention is that substrates may be sputtered at a lower cost. A further advantage of this invention is that there is less substrate heating and radiation damage due to electron bombardment of the substrates. Another advantage of this invention is that films of various thicknesses may be deposited on a plurality of different substrates under the same sputtering conditions and even at the same time. A still further advantage of this invention is that the continuous processing of substrates can be controlled automatically. Still another advantage of this invention is that the cathode-target assembly may be fabricated at a lower cost and have more reliability. Yet another advantage of this invention is that a higher deposition rate is obtained with the same RF power input as compared to the parallel-plate geometry. A yet further advantage of this invention is that resputtering can be controlled without changing the distance between the target and the anode.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An RF sputtering apparatus comprising:
a sputtering chamber;
means to partially evacuate said chamber;
an elongated anode disposed in said chamber;
an elongated target disposed in said chamber, with said anode being disposed in spaced relation to said target and surrounding said target;
an elongated cathode disposed in spaced and in electrically isolated relation to said target;
said target surrounding said cathode to
(a) define a confined space therebetween and
(b) shield said cathode from said anode at least in the region in which sputtering is to occur;
said cathode, said target, and said anode having their axes on the said axis;
means to apply a high frequency alternating voltage between said cathode and said anode; and
means in said space to transfer the high frequency alternating voltage to said target from said cathode to sputter material from said target on a substrate disposed between said target and said anode, with said last means comprising a dielectric field coupling medium between said target and said cathode for capacitive coupling therebetween of said high frequency alternating voltage.

2. The apparatus according to claim 1 including means to support a plurality of substrates on the inner surface of said anode to receive material from said target.

3. The apparatus according to claim 2 including:
means to rotate said anode;
means to dispose each of the substrates on said anode;
and means to remove each of the substrates after a selected amount of rotation of said anode for each of said substrates.

4. The apparatus according to claim 2 including means to cool said anode to maintain the temperature of each of the substrates independent of the temperature of said anode.

5. The apparatus according to claim 1 including means to confine the glow discharge between said anode and said target in a selected region therebetween.

6. The apparatus according to claim 1 adapted to support a dielectric target.

7. The apparatus according to claim 1 in which each of said anode, said cathode, and said target is cylindrical shaped.

8. The apparatus according to claim 1 including means to apply a transverse magnetic field between said cathode and said anode.

9. The apparatus according to claim 1 in which said target encloses the portion of said cathode within said chamber.

10. The apparatus according to claim 1 in which:
the inner surface of said anode defines the outer wall of said chamber;
and the outer surface of said target defines the inner wall of said chamber.

11. The apparatus according to claim 1 in which said transfer means also cools said target.

12. The apparatus according to claim 11 adapted to support a dielectric target.

13. The apparatus according to claim 11 in which each of said anode, said cathode, and said target is cylindrical shaped.

14. The apparatus according to claim 11 in which said target encloses the portion of said cathode within said chamber.

15. The apparatus according to claim 11 in which:
the inner surface of said anode defines the outer wall of said chamber;
and the outer surface of said target defines the inner wall of said chamber.

16. The apparatus according to claim 11 including means to apply a transverse magnetic field between said cathode and said anode.

17. An RF sputtering apparatus comprising:
a sputtering chamber;
means to partially evacuate said chamber;
an elongated anode disposed in said chamber;
an elongated target disposed in said chamber, with said anode being disposed in spaced relation to said target and surrounding said target;
an elongated cathode disposed in spaced relation to said target;
said target surrounding said anode to shield said cathode from said anode at least in the region in which sputtering is to occur;
said cathode, said target and said anode having their axes on the same axis;
means to apply a high frequency alternating voltage between said cathode and said anode; and
means to cool said target and to transfer the high frequency alternating voltage to said target from said cathode to sputter material from said target on a substrate disposed between said target and said anode, with said last means comprising
a field coupling medium between said target and said cathode, and
means to supply a dielectric coolant in the space between the outer surface of said cathode and the inner surface of said target with the dielectric coolant transferring the high frequency alternating voltage to said target.

18. The apparatus according to claim 17 including means to support a plurality of substrates on the inner surface of said anode.

19. An RF sputtering apparatus comprising:
a sputtering chamber;
means to partially evacuate said chamber;
an elongated anode disposed in said chamber;
an elongated target disposed in said chamber, with said anode being disposed in spaced relation to said target and surrounding said target;
an elongated cathode disposed in spaced relation to said target, with said target surrounding said cathode to shield said cathode from said anode at least in the region in which sputtering is to occur, with said cathode, and with said target, and said anode having their axes on the same axis;
means to apply a high frequency alternatng voltage between said cathode and said anode; and
means to cool said target and to transfer the high frequency alternating voltage to said target from said cathode to sputter material from said target on a substrate disposed between said target and said anode, with said last means comprising (a) a field coupling medium between said target and said cathode, (b) a liquid metal disposed in the space between the outer surface of said cathode and the inner surface of said target with the liquid metal transferring the high frequency alternating voltage to said target; and (c) means to circulate a coolant within said cathode to cool the liquid metal.

20. An RF sputtering apparatus comprising:
a sputtering chamber;
means to partially evacuate said chamber;
an elongated anode disposed in said chamber;
an elongated target disposed in said chamber, with said anode being disposed in spaced relation to said target and surrounding said target;
an elongated cathode disposed in spaced relation to said target, with said target surrounding said cathode to shield said cathode from said anode at least in the region in which sputtering is to occur, and with said cathode, said target and said anode having their axes on the same axis;
means to apply a high frequency alternating voltage between said cathode and said anode; and
means to cool said target and to transfer the high frequency alternating voltage to said target from said cathode to sputter material from said target on a substrate disposed between said target and said anode, with said last means comprising (a) a field coupling medium between said target and said cathode, (b) a metallic paste disposed in the space between the outer surface of said cathode and the inner surface of said target with the metallic paste transferring the high frequency alternating voltage to said target; and (c) means to circulate a coolant within said cathode to cool the metallic paste.

21. A method for depositing a coating on a substrate by RF sputtering comprising:
disposing an elongated anode and an elongated target within a sputtering chamber;
disposing the anode in spaced relation to the target with the anode surrounding the target;
disposing an elongated cathode within the target and in spaced and electrically isolated relation to the target so that the target surrounds the cathode to form a confined space therebetween and to shield the cathode from the anode at least in the region in which sputtering is to occur;
arranging the axes of the cathode, the target, and the anode on the same axis;
partially evacuating said chamber;
applying a high frequency alternating voltage between the cathode and the anode; and
capacitively transferring the high frequency alternating voltage to the target from the cathode to sputter material from the target on a substrate disposed beween the target and the anode.

22. The method according to claim 21 including cooling the target by circulating a dielectric coolant in the space between the cathode and the target.

23. The method according to claim 22 including forming the target of a dielectric material.

24. The method of claim 22 wherein is included the forming of said target of a dielectric material.

25. The method according to claim 21 including cooling the target by disposing a liquid metal in the space between the cathode and the target and cooling the liquid metal by cooling the cathode.

26. The method according to claim 21 including cooling the target by disposing a metallic paste in the space between the cathode and the target and cooling the metallic paste by cooling the cathode.

27. The method according to claim 21 including cooling the target by cooling the cathode to transfer heat from the target to the cathode by radiation through the space therebetween.

28. The method according to claim 27 wherein is included the forming of said target of a dielectric material.

29. The method according to claim 27 wherein is included the forming of each of the anode, the cathode, and the target with a cylindrical shape.

30. The method according to claim 21 including:
disposing a plurality of substrates in the inner surface of the anode for support thereon to receive the material sputtering from the target;
rotating the anode;
and removing each of the substrates after a selected amount of rotation of the anode for each of the substrates.

31. The method according to claim 30 including maintaining the temperature of the substrates independent of the temperature of the anode by cooling the anode.

32. The method according to claim 21 wherein is included the forming of said target of a dielectric material.

33. The method according to claim 21 wherein is included the forming of each of the anode, the cathode, and the target with a cylindrical shape.

34. The method according to claim 21 including applying a transverse magnetic field between the cathode and the anode.

35. The method according to claim 21 in which the target encloses the portion of the cathode within the chamber.

36. The method according to claim 21 including confining the glow discharge between the anode and the target in a selected region therebetween.

References Cited

UNITED STATES PATENTS 3,528,902 9/1970 Wasa et al. ---------- 204—298

HOWARD S. WILLIAMS, Primary Examiner

S. S. KANTER, Assistant Examiner

U.S. Cl. X.R.

204—298